US011956580B2

(12) United States Patent
Muraoka et al.

(10) Patent No.: US 11,956,580 B2
(45) Date of Patent: Apr. 9, 2024

(54) MICROPHONE ASSEMBLY AND HEADLINING ASSEMBLY

(71) Applicant: HOSIDEN CORPORATION, Osaka (JP)

(72) Inventors: Shunji Muraoka, Osaka (JP); Shushin Noda, Osaka (JP); Yoshifumi Yamanaka, Osaka (JP); Kouta Onoyama, Osaka (JP); Daisuke Kitaguchi, Osaka (JP); Jun Miyajima, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 0 days.

(21) Appl. No.: 17/706,236

(22) Filed: Mar. 28, 2022

(65) Prior Publication Data

US 2022/0321985 A1 Oct. 6, 2022

(30) Foreign Application Priority Data

Apr. 2, 2021 (JP) ................................. 2021-063334

(51) Int. Cl.
*H04R 1/04* (2006.01)
*H04R 1/08* (2006.01)

(52) U.S. Cl.
CPC ............... *H04R 1/04* (2013.01); *H04R 1/083* (2013.01); *H04R 2499/13* (2013.01)

(58) Field of Classification Search
CPC .......................... H04R 19/005; H04R 2499/13
See application file for complete search history.

(56) References Cited

U.S. PATENT DOCUMENTS

| | | | | |
|---|---|---|---|---|
| 2012/0027241 A1* | 2/2012 | Turnbull | ................ | H04R 1/086 381/361 |
| 2012/0308045 A1* | 12/2012 | Minoo | ................... | H04R 1/342 381/111 |
| 2020/0145743 A1* | 5/2020 | Riemann | ................ | H04R 1/083 |
| 2021/0204044 A1* | 7/2021 | Marton | .................... | H04R 1/02 |

FOREIGN PATENT DOCUMENTS

| | | |
|---|---|---|
| JP | H 05-58228 | 3/1993 |
| WO | WO2018/077870 A1 | 5/2018 |

OTHER PUBLICATIONS

ESSR issued in European Patent Office (EPO) Counterpart Patent Appl. No. 22162204.6, dated Sep. 9, 2022.

* cited by examiner

*Primary Examiner* — Suhan Ni
(74) *Attorney, Agent, or Firm* — Greenblum & Bernstein, P.L.C.

(57) ABSTRACT

A microphone assembly comprises a circuit board, a microphone element connected to the circuit board, an external connection interface connected to the circuit board, and hot melt that is formed to cover the circuit board, the microphone element, and the external connection interface and has a hole formed to expose a part of the back side of the circuit board or the sound receiving part of the microphone element.

1 Claim, 16 Drawing Sheets

MICROPHONE ASSEMBLY AND HEADLINING ASSEMBLY

TECHNICAL FIELD

The present invention relates to a microphone assembly and a headlining assembly.

BACKGROUND ART

A conventional in-vehicle microphone device assembled into a ceiling in a vehicle has a structure such that the top surface of the housing is viewed from the inside of the vehicle. For example, Japanese Patent Application Laid-Open No. H05-58228 is disclosed as a conventional example. A microphone mounting structure to a molding ceiling material according to Japanese Patent Application Laid-Open No. H05-58228 is provided to prevent damage to a headlining by reducing a stress applied to the headlining when a microphone is bonded to a side of the ceiling of the headlining and a fixture is pressed and fixed into the microphone from a side of the headlining in a vehicle. A double-sided tape having a smaller area than the mounting surface of the microphone is bonded to the mounting surface, an opposite surface from the adhesive surface of an undersheet having a larger area than the mounting surface is bonded to the opposite side of the double-sided tape, the adhesive surface of the undersheet is bonded to the headlining, and then a push-lock fixture is pressed and fixed into the sound collecting opening of the microphone penetrating inward.

According to the microphone mounting structure of Japanese Patent Application Laid-Open No. H05-58228 has a structure such that a headliner is held between a microphone housing and a backplate, so that the microphone housing is viewed from the inside of the vehicle and leads to a poor design.

The interior design of the vehicle can be simplified by placing in-vehicle microphone devices on a headlining skin or the back side of a substrate. However, findings have not been sufficiently accumulated to determine whether such a layout ensures the performance of the in-vehicle microphone devices.

SUMMARY OF THE INVENTION

An object of the present invention is to provide a microphone assembly that sufficiently ensures the performance of a microphone even if the microphone assembly is disposed on a headlining skin or the back side of a substrate.

A microphone assembly of the present invention comprises a circuit board, a microphone element connected to the circuit board, an external connection interface connected to the circuit board, and hot melt that is formed to cover the circuit board, the microphone element, and the external connection interface and has a hole formed to expose a part of the back side of the circuit board or the sound receiving part of the microphone element.

Effects of the Invention

The microphone assembly of the present invention sufficiently ensures the performance of a microphone even if the microphone assembly is disposed on a headlining skin or the back side of a substrate.

DETAILED DESCRIPTION

Figure 1:
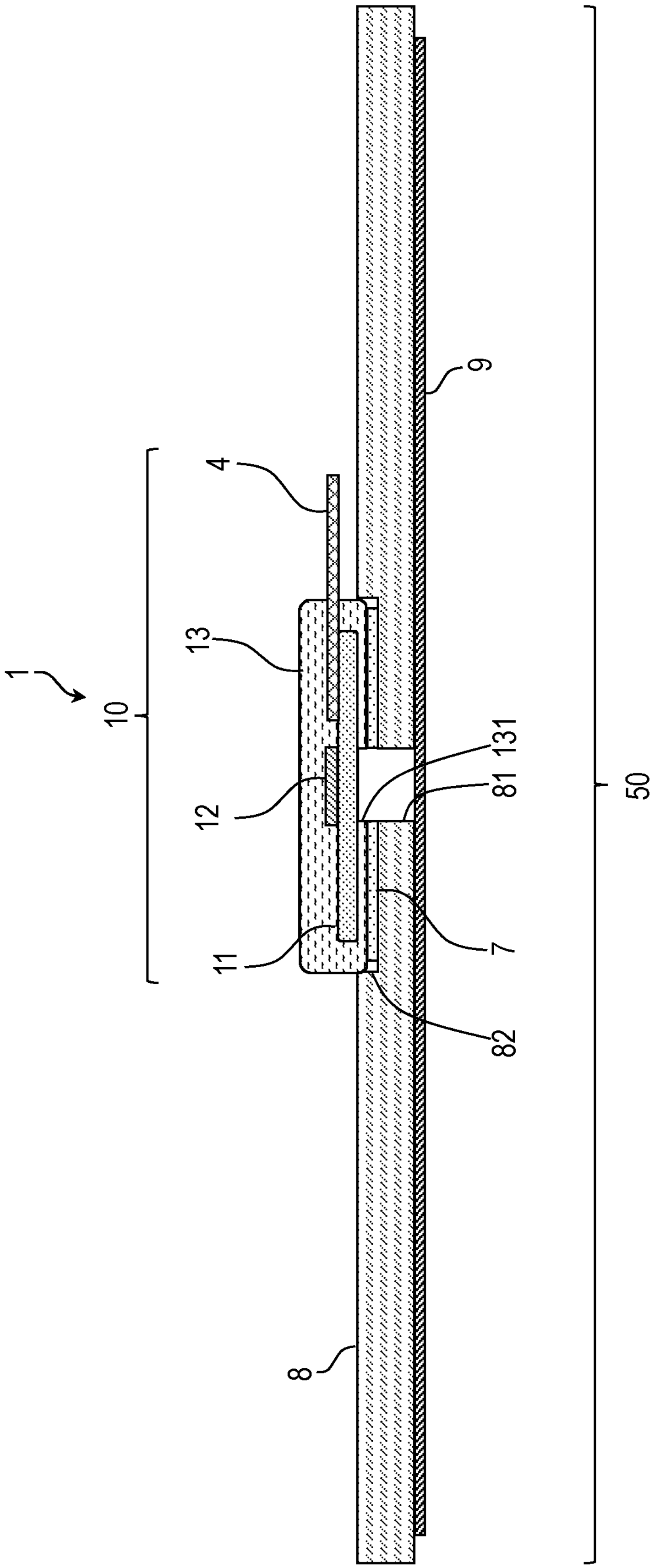
FIG. 1 is a cross-sectional view illustrating a headlining assembly of a first embodiment.

Embodiments of the present invention will be specifically described below. Components having the same function are indicated by the same reference numerals, and a duplicate explanation thereof is omitted.

First Embodiment

Referring to FIG. 1, the structure of a headlining assembly 1 of a first embodiment will be described below. As illustrated in FIG. 1, the headlining assembly 1 of the present embodiment comprises a microphone assembly 10 and a headlining 50.

The microphone assembly 10 comprises a circuit board 11, a microphone element 12 placed on the front side of the circuit board 11, a cable 4 connected to the circuit board 11, and hot melt 13 that is formed to cover the circuit board 11, the microphone element 12, and the cable 4 and has a hole 131 formed to expose a part of the back side of the circuit board 11.

The microphone element 12 may be, for example, an MEMS microphone or other elements. The cable 4 may be substituted by another structure that acts as an external connection interface. For example, a direct connect connector may be directly drawn from the hot melt 13. On the circuit board 11, necessary circuit components other than the microphone element 12 may be mounted. The hole 131 may be larger than that of FIG. 1. The hole 131 may be formed over the back side of the hot melt 13. In other words, the hot melt 13 may be absent on the back side of the circuit board 11.

The headlining 50 has a recessed part 82 for placing the back side of the microphone assembly 10 on the front side of the headlining 50. The headlining 50 includes a substrate 8 that is fixed to the back side of the microphone assembly 10 with an adhesive layer 7, and a skin 9 covering the back side of the substrate 8. As illustrated in FIG. 1, the headlining 50 may have a hole 81 at a position aligned with the hole 131 (the hole 81 is not always necessary). The hole 81 further improves the sensitivity of the microphone. The adhesive layer 7 may be, for example, double-sided tape, cushioning urethane with an adhesive applied on both sides, or an adhesive.

A resin housing frequently used in a conventional microphone assembly has the functions of protecting internal components, preventing drips of water, and preventing static electricity. The hot melt used in the present embodiment has these functions and thus can substitute for the resin housing. The use of the hot melt can easily form a tone hole necessary for the microphone.

In view of acoustic performance, the tone hole is preferably short because a resonance frequency increases accordingly. In the present embodiment, the hole 131 formed on the hot melt 13 and the hole 81 located on the substrate 8 form a short tone hole, thereby obtaining a preferable acoustic structure with small dimensions that cannot be obtained by the conventional resin housing.

<First Modification of the First Embodiment>

Figure 2:
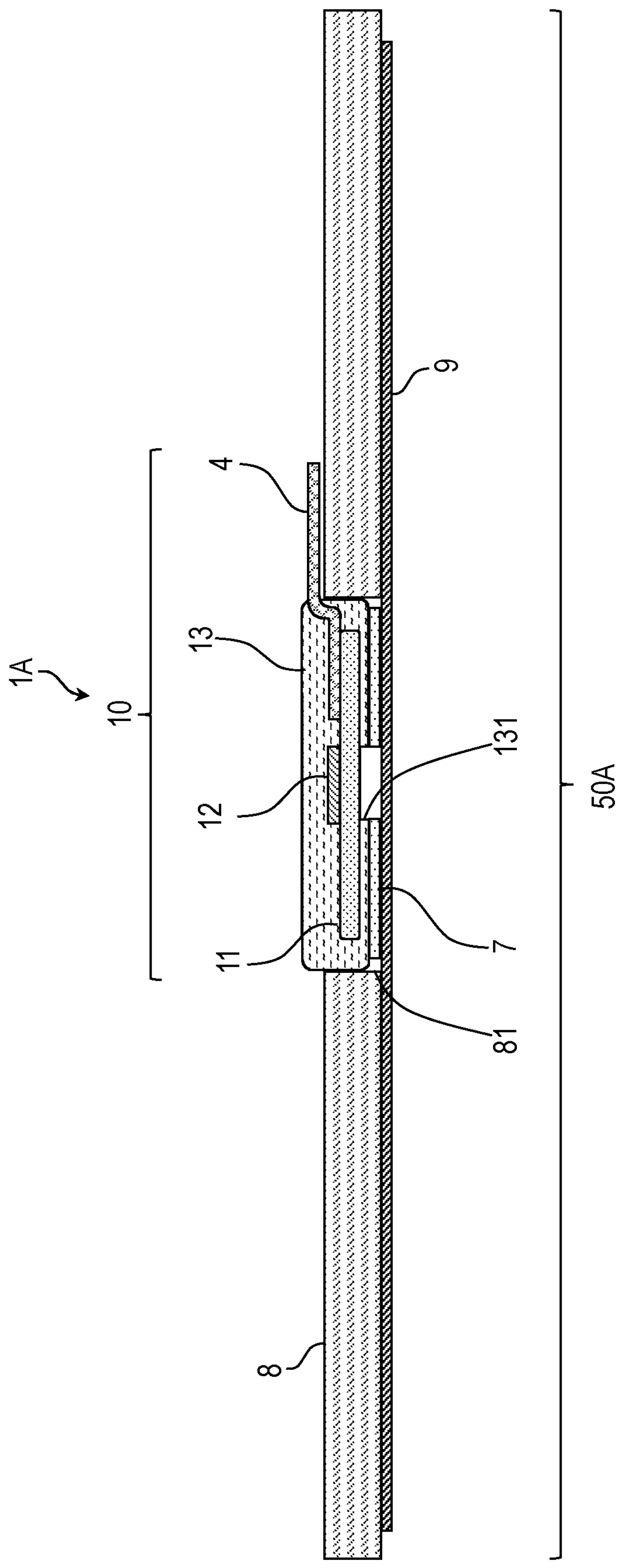
FIG. 2 is a cross-sectional view illustrating a headlining assembly according to a first modification of the first embodiment.

Referring to FIG. 2, the structure of a headlining assembly 1A according to a first modification of the first embodiment will be described below. As illustrated in FIG. 2, the headlining assembly 1A of the present modification comprises a microphone assembly 10 and a headlining 50A.

A substrate 8 of the headlining 50A has a hole 81 passing through the substrate 8. In the present modification, the microphone assembly 10 is fit into the hole 81 located on the substrate 8. In the present modification, the back side of the microphone assembly 10 is fixed to a skin 9 with an adhesive layer 7.

In the headlining assembly 1A according to the first modification, the hole 81 does not act as a tone hole, but only a hole 131 acts as a tone hole. This can further reduce the depth of the tone hole, thereby designing a high resonance frequency.

Second Embodiment

Figure 3:
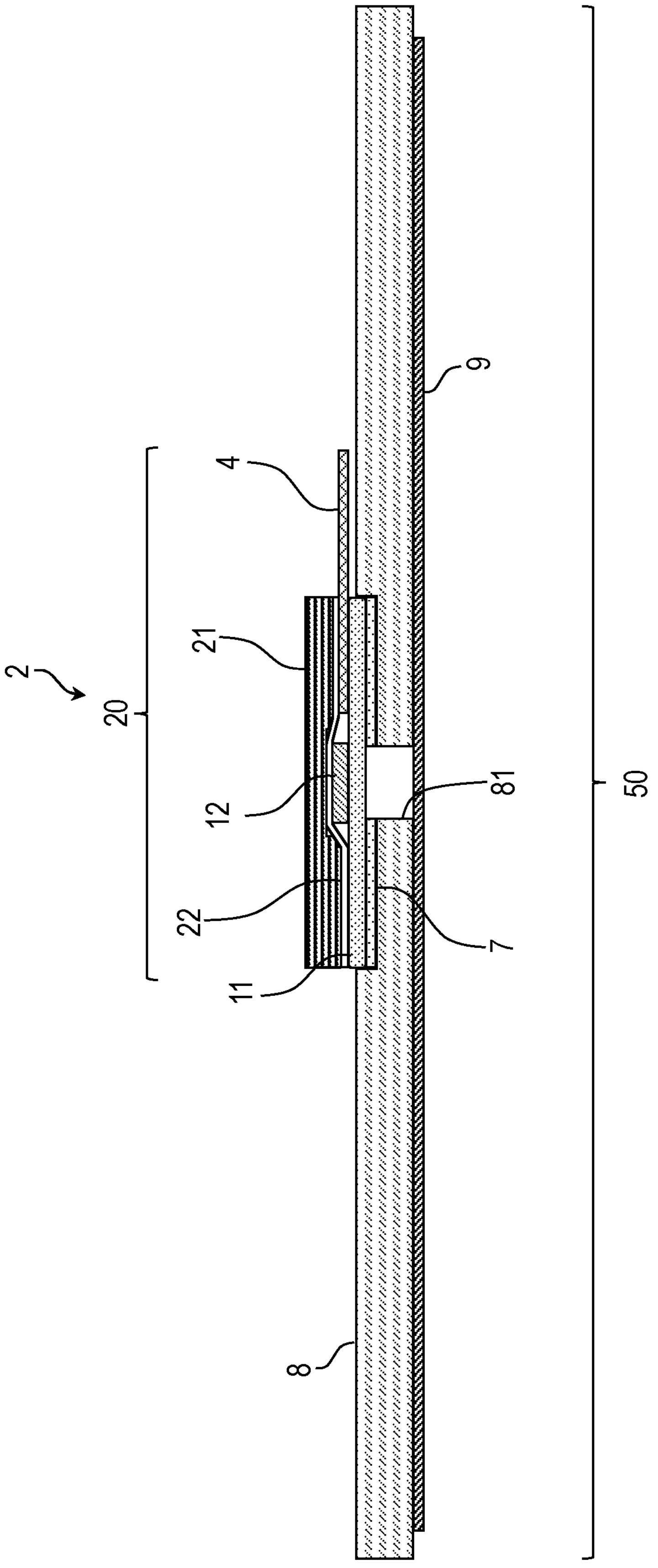
FIG. 3 is a cross-sectional view illustrating a headlining assembly of a second embodiment.

Referring to FIG. 3, the structure of a headlining assembly 2 of a second embodiment will be described below. As illustrated in FIG. 3, the headlining assembly 2 of the present embodiment comprises a microphone assembly 20 and a headlining 50. As in the first embodiment, the headlining 50 may have no hole 81.

The microphone assembly 2 comprises a circuit board 11, a microphone element 12 placed on the front side of the circuit board 11, a cable 4 connected to the circuit board 11, and a hood 21 and an adhesive layer 22 that are formed over the front side of the circuit board 11, the microphone element 12, and the cable 4. The hood 21 may be composed of, for example, a polyurethane foam. The hood 21 is bonded to the front side of the circuit board 11 and the front side of the microphone element 12 with the adhesive layer 22. The headlining 50 is similar to that of the first embodiment.

The microphone element 12 may be, for example, an MEMS microphone or other elements. The cable 4 may be substituted by another structure as in the first embodiment. For example, a direct connect connector may be directly drawn from the hood 21. An adhesive layer 7 and the adhesive layer 22 may be, for example, double-sided tape, cushioning urethane with an adhesive applied on both sides, or an adhesive. On the circuit board 11, necessary circuit components other than the microphone element 12 may be mounted. On the board or the microphone element 12, a nonwoven fabric or a cloth may be bonded to provide dust prevention and waterproofness.

A resin housing frequently used in a conventional microphone assembly has the functions of protecting internal components, preventing drips of water, and preventing static electricity. The hood 21 used in the present embodiment does not impair these functions and thus can substitute for a resin housing. Only a minimum necessary number of components is left, achieving a light weight and low cost. In view of acoustic performance, the tone hole is preferably short because a resonance frequency increases accordingly. In the present embodiment, only the hole 81 of a substrate 8 serves as a tone hole, achieving a preferable acoustic structure.

<First Modification of the Second Embodiment>

Figure 4:
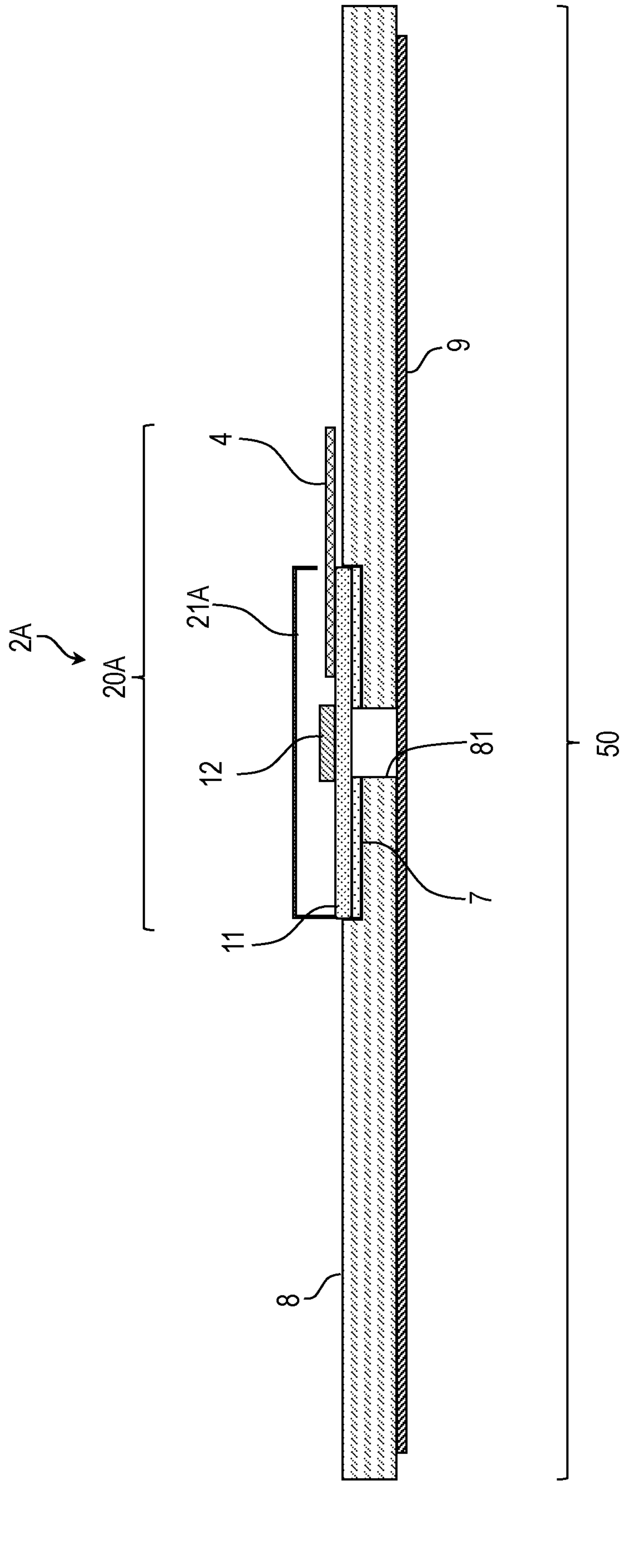
FIG. 4 is a cross-sectional view illustrating a headlining assembly according to a first modification of the second embodiment.

Referring to FIG. 4, the structure of a headlining assembly 2A according to a first modification of the second embodiment will be described below. As illustrated in FIG. 4, the headlining assembly 2A of the present modification comprises a microphone assembly 20A and a headlining 50. As in the first embodiment, the headlining 50 may have no hole 81.

The present modification is different from the second embodiment in the shape and material of a hood 21A. As illustrated in FIG. 4, the hood 21A is shaped like a lid covering the front side of a circuit board 11, a microphone element 12, and a cable 4 with a gap. The hood 21A is made of a metal having a certain degree of strength, thereby protecting mounted components from an external force and electro-static discharge (ESD). The headlining 50 is similar to that of the first embodiment.

<Second Modification of the Second Embodiment>

Figure 5:
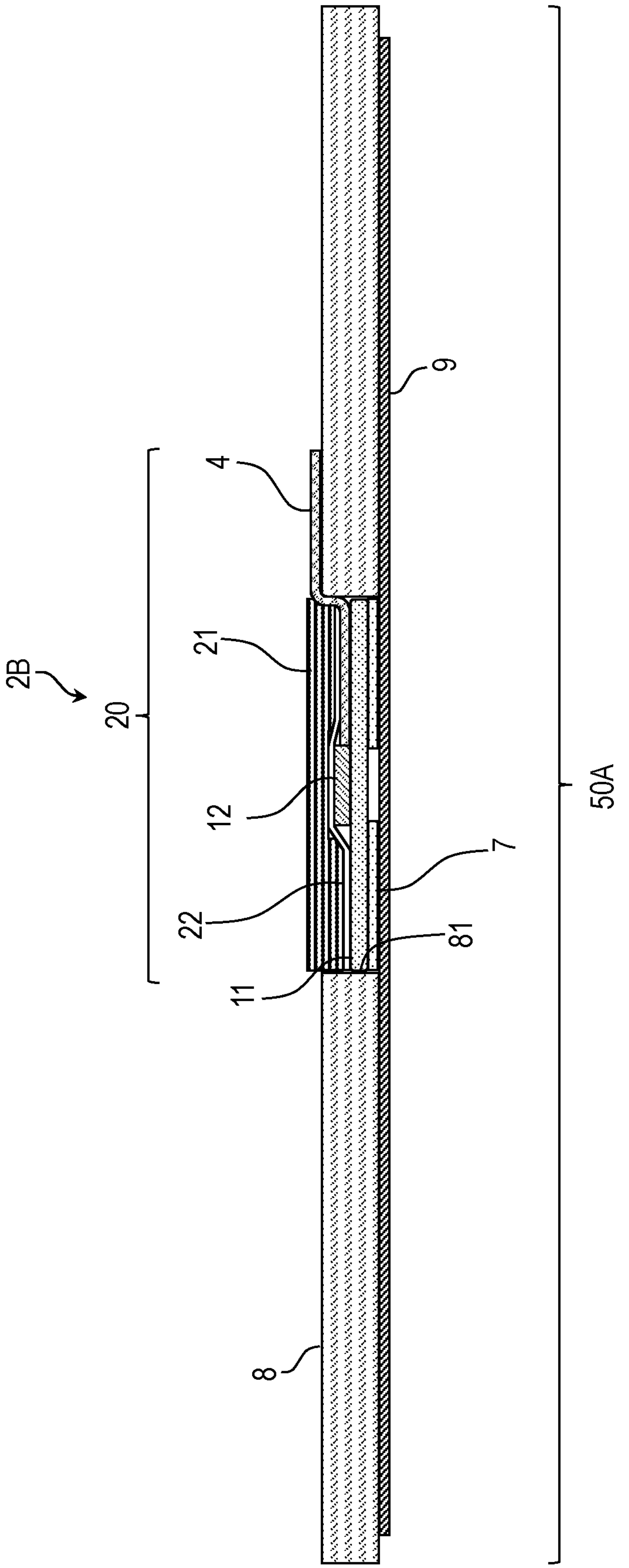
FIG. 5 is a cross-sectional view illustrating a headlining assembly according to a second modification of the second embodiment.

Referring to FIG. 5, the structure of a headlining assembly 2B according to a second modification of the second embodiment will be described below. As illustrated in FIG. 5, the headlining assembly 2B of the present modification comprises a microphone assembly 20 and a headlining 50A.

In the present modification, the microphone assembly 20 is fit into a hole 81 that is located on a substrate 8 and passes through the substrate 8. In the present modification, the back side of the microphone assembly 20 is fixed to a skin 9 with an adhesive layer 7.

In the headlining assembly 2B according to the present modification, the hole 81 does not act as a tone hole, but only a gap formed between the headlining assembly 2B and the adhesive layer 7 acts as a tone hole. This can further reduce the depth of the tone hole, thereby designing a high resonance frequency.

Third Embodiment

Figure 6:
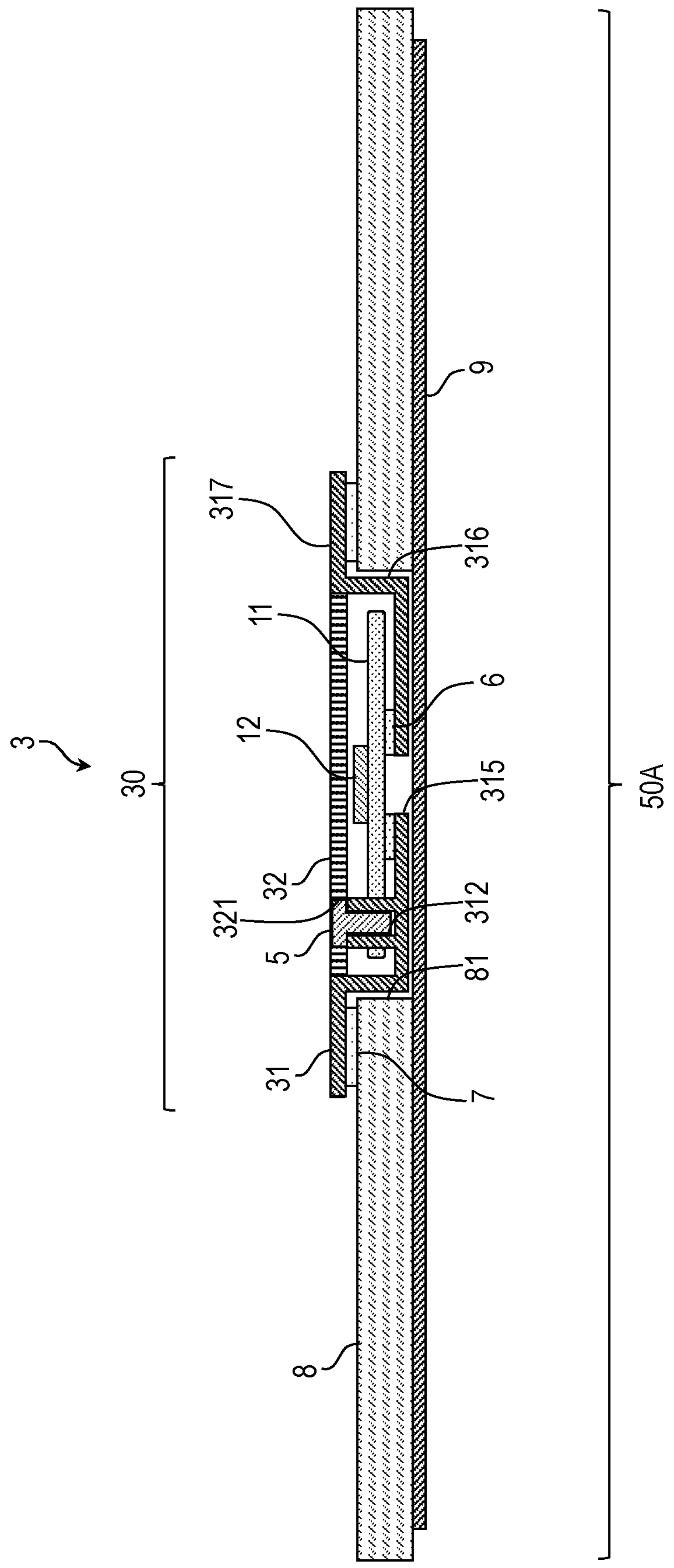
FIG. 6 is a cross-sectional view illustrating a headlining assembly of a third embodiment.

Referring to FIG. 6, the structure of a headlining assembly 3 of a third embodiment will be described below. As illustrated in FIG. 6, the headlining assembly 3 of the present embodiment comprises a microphone assembly 30 and a headlining 50A.

The microphone assembly 30 comprises a circuit board 11, a microphone element 12 placed on the front side of the circuit board 11, a cable (not illustrated) connected to the circuit board 11, a lower housing 31 for placing the circuit board 11, the lower housing 31 having a hole 315 formed to expose a part of the back side of the circuit board 11, and an upper housing 32 that is fixed to the lower housing 31 and is formed to cover the front side of the circuit board 11, the microphone element 12, and the cable. An adhesive layer 6 is provided on the front side of the lower housing 31, and the circuit board 11 is fixed to the lower housing 31 with the adhesive layer 6. The cable may be substituted by a direct connect connector as in the first embodiment. On the circuit board 11, necessary circuit components other than the microphone element 12 may be mounted as in the first embodiment. On the board or the microphone element 12, a nonwoven fabric or a cloth may be bonded to provide dust prevention and waterproofness. The present embodiment includes two housings: the lower housing 31 and the upper housing 32. The number of housings is not limited, and three or more housings may be combined. Alternatively, the function of protecting internal components may be obtained by machining and assembling (e.g., bending) a single housing. It is assumed that the housing is machined and assembled before being attached to the headlining.

The headlining 50A includes a substrate 8 that has a front side fixed to the back side of the microphone assembly 30 with an adhesive layer 7, and a skin 9 covering the back side of the substrate 8. The adhesive layers 6 and 7 may be, for example, double-sided tape, cushioning urethane with an adhesive applied on both sides, or an adhesive.

The microphone assembly 30 and the headlining 50A have characteristics in common with the modifications 1-10 of the third embodiment. The modifications will be described later.

More specifically, the lower housing 31 of the present embodiment includes a body part 316 that has an upper opening part, stores the circuit board 11, the microphone element 12, and the cable, and is fit into a hole 81 located on the substrate 8, and a flange part 317 that extends outward from the opening part of the body part 316 in a plane parallel to the substrate 8. The back side of the flange part 317 is fixed to the front side of the substrate 8 with the adhesive layer 7. The upper housing 32 has a structure that covers the opening part of the body part 316. The upper housing 32 has a screw hole 321, and the body part 316 has a threaded hole 312 extending upward from the bottom. A screw 5 is inserted into the screw hole 321 and is screwed into the threaded hole 312, thereby fixing the upper housing 32 to the lower housing 31.

<First Modification of the Third Embodiment>

Figure 7:
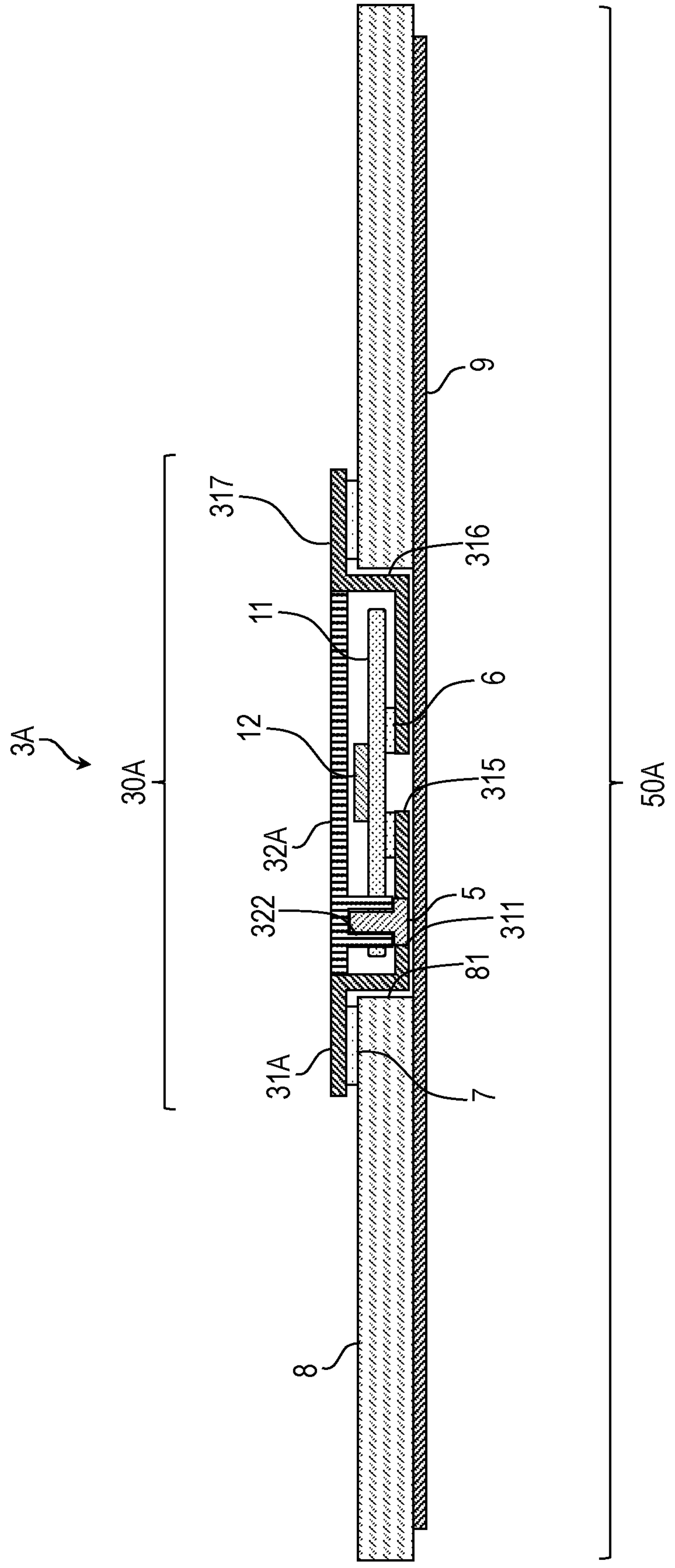
FIG. 7 is a cross-sectional view illustrating a headlining assembly according to a first modification of the third embodiment.

Referring to FIG. 7, the structure of a headlining assembly 3A according to a first modification of the third embodiment will be described below. As illustrated in FIG. 7, the headlining assembly 3A of the present modification comprises a microphone assembly 30A and a headlining 50A.

A lower housing 31A of the present modification includes a body part 316 that has an upper opening part, stores a circuit board 11, a microphone element 12, and a cable, and is fit into a hole 81 located on a substrate 8, and a flange part 317 that extends outward from the opening part of the body part 316 in a plane parallel to the substrate 8. The back side of the flange part 317 is fixed to the front side of the substrate 8 with an adhesive layer 7. An upper housing 32A has a structure that covers the opening part of the body part 316. The upper housing 32A has a threaded hole 322 extending downward from the back side. The lower housing 31A has a screw hole 311 at the bottom. A screw 5 is inserted into the screw hole 311 and is screwed into the threaded hole 322, thereby fixing the upper housing 32A to the lower housing 31A.

<Second Modification of the Third Embodiment>

Figure 8:
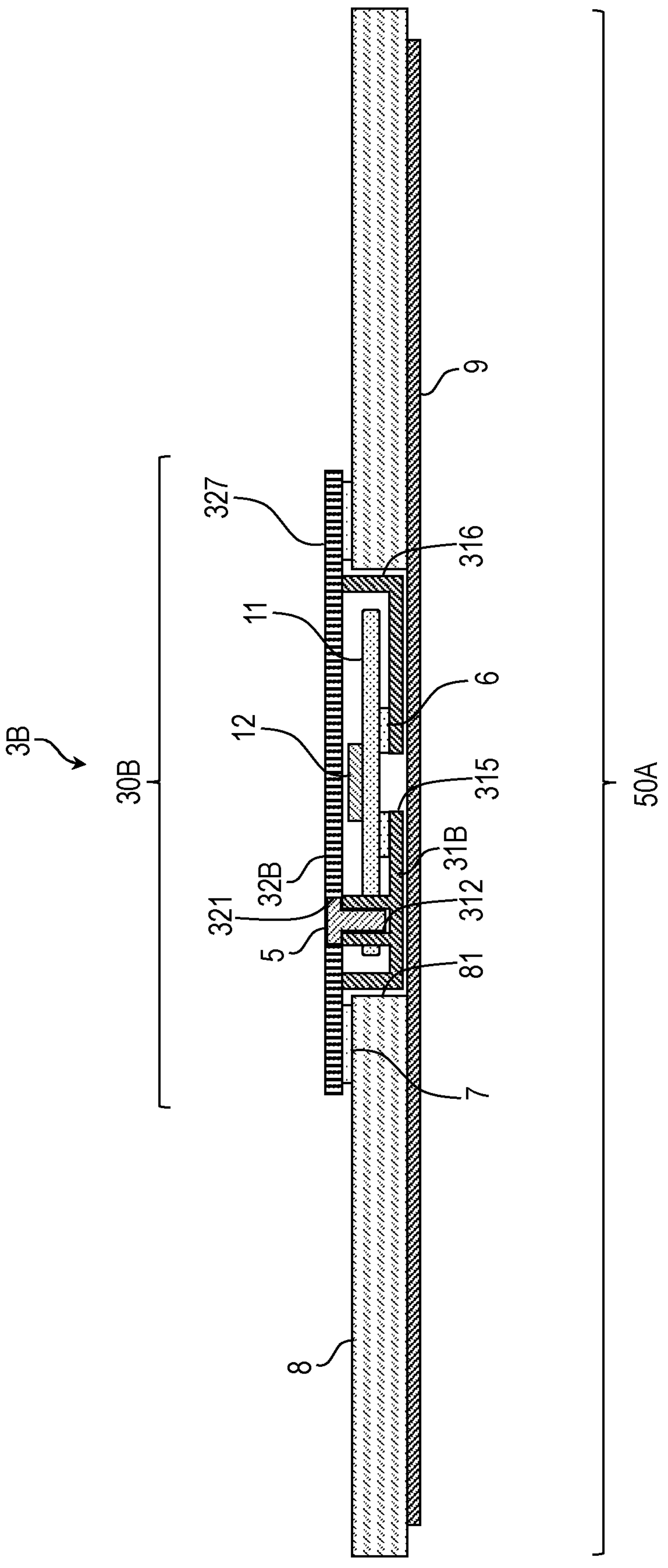
FIG. 8 is a cross-sectional view illustrating a headlining assembly according to a second modification of the third embodiment.

Referring to FIG. 8, the structure of a headlining assembly 3B according to a second modification of the third embodiment will be described below. As illustrated in FIG. 8, the headlining assembly 3B of the present modification comprises a microphone assembly 30B and a headlining 50A.

A lower housing 31B of the present modification includes a body part 316 that has an upper opening part, stores a circuit board 11, a microphone element 12, and a cable, and is fit into a hole 81 located on a substrate 8. An upper housing 32B has a structure that covers the opening part of the body part 316 and includes a flange part 327 extending outside the body part 316. The back side of the flange part 327 is fixed to the front side of the substrate 8 with an adhesive layer 7. The upper housing 32B has a structure that covers the opening part of the body part 316. The upper housing 32B has a screw hole 321, and the body part 316 has a threaded hole 312 extending upward from the bottom. A screw 5 is inserted into the screw hole 321 and is screwed into the threaded hole 312, thereby fixing the upper housing 32B to the lower housing 31B.

<Third Modification of the Third Embodiment>

Figure 9:
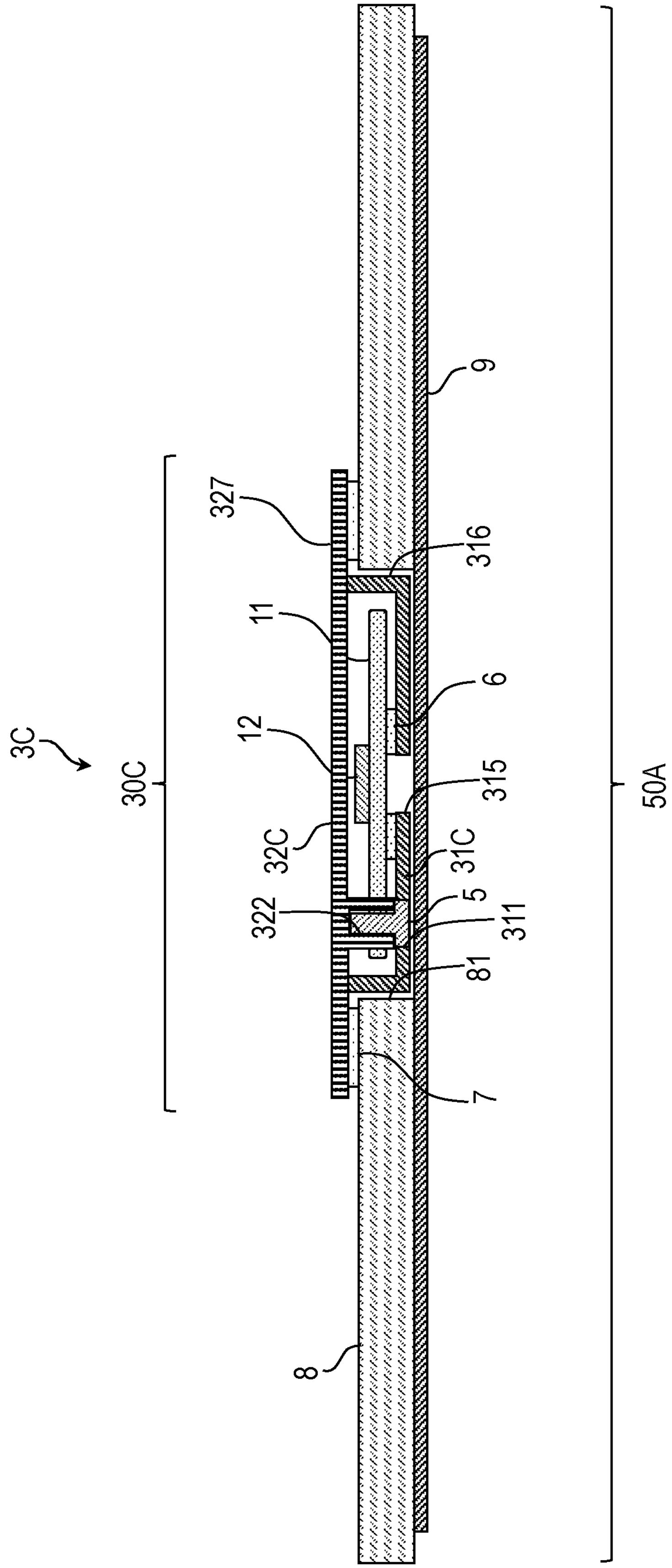
FIG. 9 is a cross-sectional view illustrating a headlining assembly according to a third modification of the third embodiment.

Referring to FIG. 9, the structure of a headlining assembly 3C according to a third modification of the third embodiment will be described below. As illustrated in FIG. 9, the headlining assembly 3C of the present modification comprises a microphone assembly 30C and a headlining 50A.

A lower housing 31C of the present modification includes a body part 316 that has an upper opening part, stores a circuit board 11, a microphone element 12, and a cable, and is fit into a hole 81 located on a substrate 8. An upper housing 32C has a structure that covers the opening part of the body part 316 and includes a flange part 327 extending outside the body part 316. The back side of the flange part 327 is fixed to the front side of the substrate 8 with an adhesive layer 7. The upper housing 32C has a threaded hole 322 extending downward from the back side. The lower housing 31C has a screw hole 311 at the bottom. A screw 5 is inserted into the screw hole 311 and is screwed into the threaded hole 322, thereby fixing the upper housing 32C to the lower housing 31C.

<Fourth Modification of the Third Embodiment>

Figure 10:
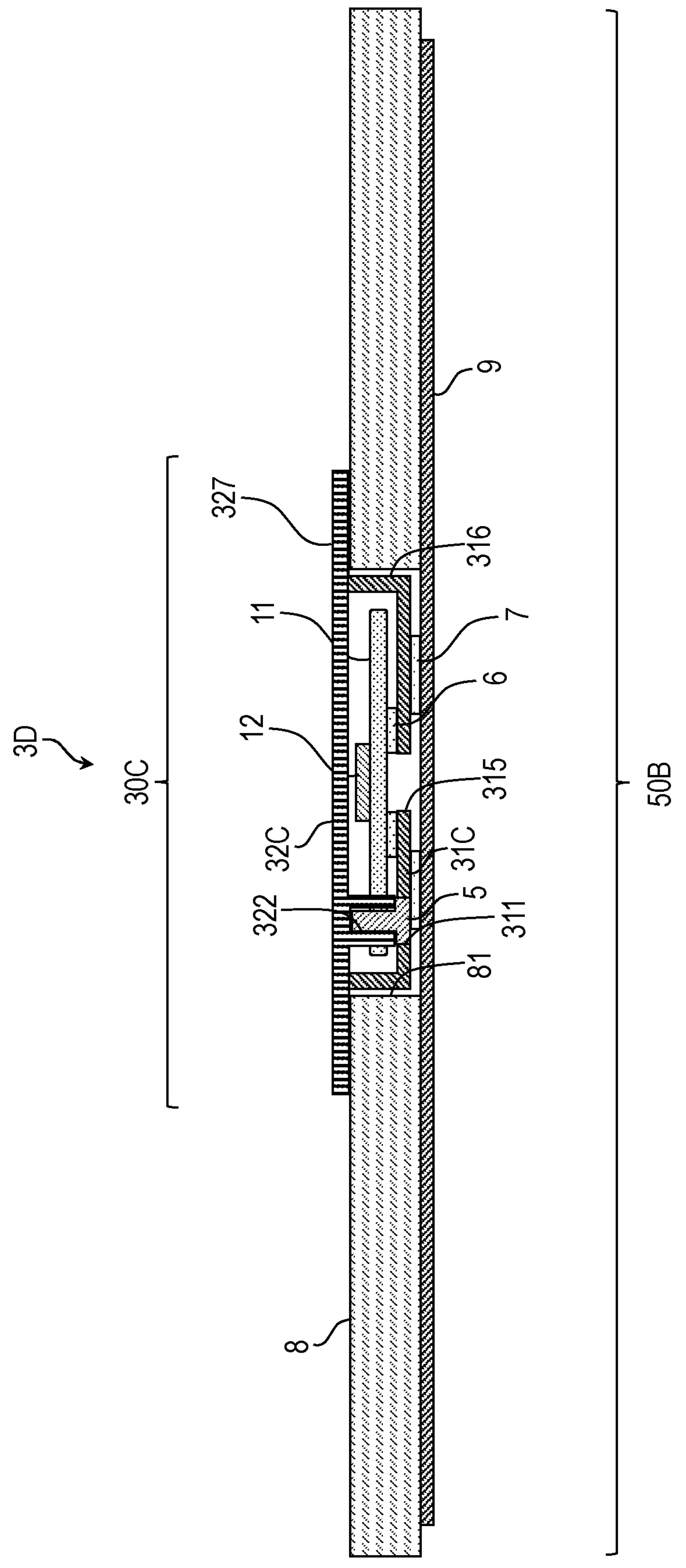
FIG. 10 is a cross-sectional view illustrating a headlining assembly according to a fourth modification of the third embodiment.

Referring to FIG. 10, the structure of a headlining assembly 3D according to a fourth modification of the third embodiment will be described below. As illustrated in FIG. 10, the headlining assembly 3D of the present modification comprises a microphone assembly 30C and a headlining 50B. In the present modification, an adhesive layer 7 is located at a different position, and the back side of a lower housing 31C and a skin 9 are fixed to each other with the adhesive layer 7.

<Fifth Modification of the Third Embodiment>

Figure 11:
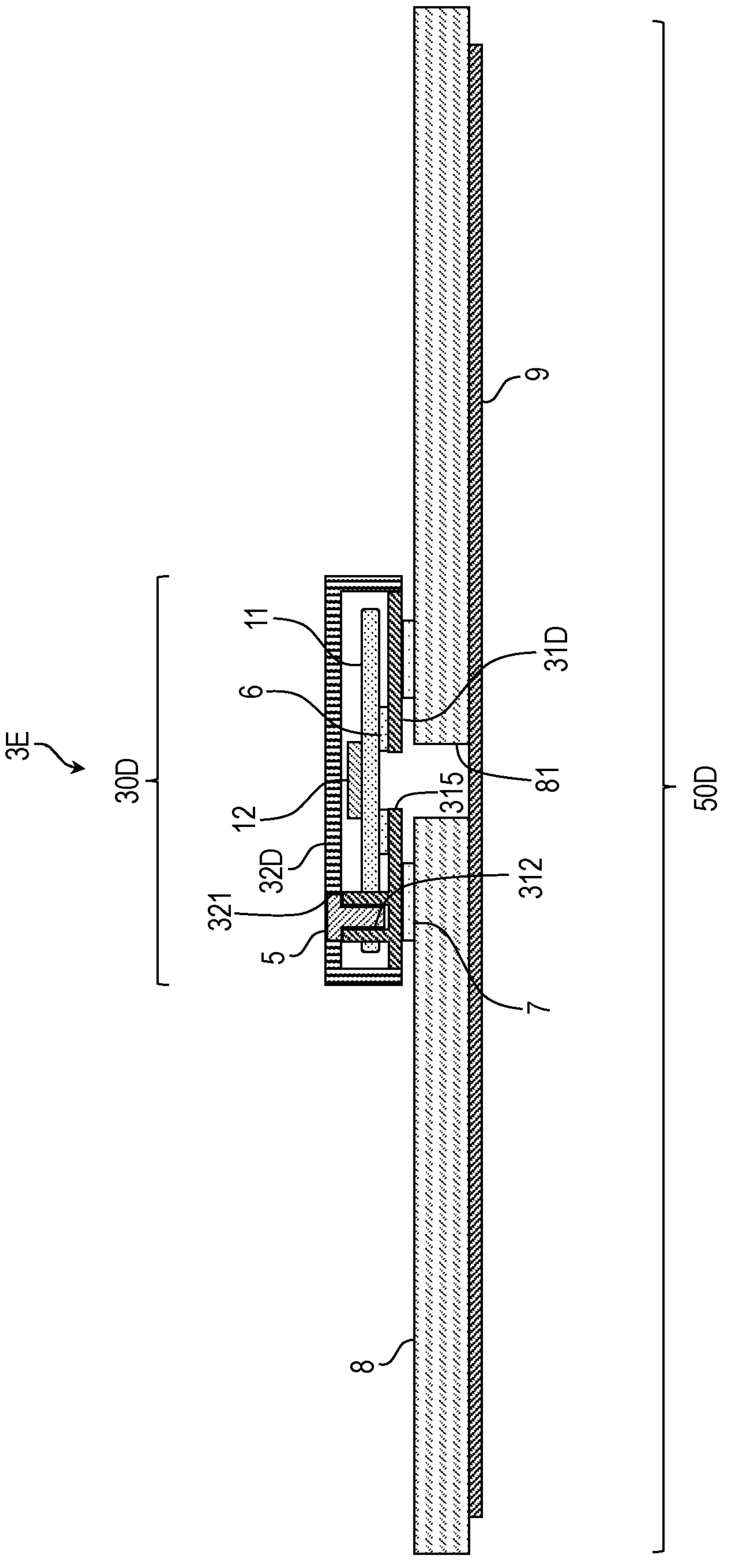
FIG. 11 is a cross-sectional view illustrating a headlining assembly according to a fifth modification of the third embodiment.

Referring to FIG. 11, the structure of a headlining assembly 3E according to a fifth modification of the third embodiment will be described below. As illustrated in FIG. 11, the headlining assembly 3E of the present modification comprises a microphone assembly 30D and a headlining 50D.

A lower housing 31D of the present modification is shaped like a plate including the foregoing hole 315. The lower housing 31D has a circuit board 11, a microphone element 12, and a cable that are mounted thereon, is disposed at a position where the hole 315 is aligned with a hole 81 located on a substrate 8, and is fixed to the front side of the substrate 8 with an adhesive layer 7. An upper housing 32D is shaped to cover the lower housing 31D, the circuit board 11, the microphone element 12, and the cable. The upper housing 32D has a screw hole 321, and the lower housing 31D has a threaded hole 312 extending upward from the bottom. A screw 5 is inserted into the screw hole 321 and is screwed into the threaded hole 312, thereby fixing the upper housing 32D to the lower housing 31D.

<Sixth Modification of the Third Embodiment>

Figure 12:
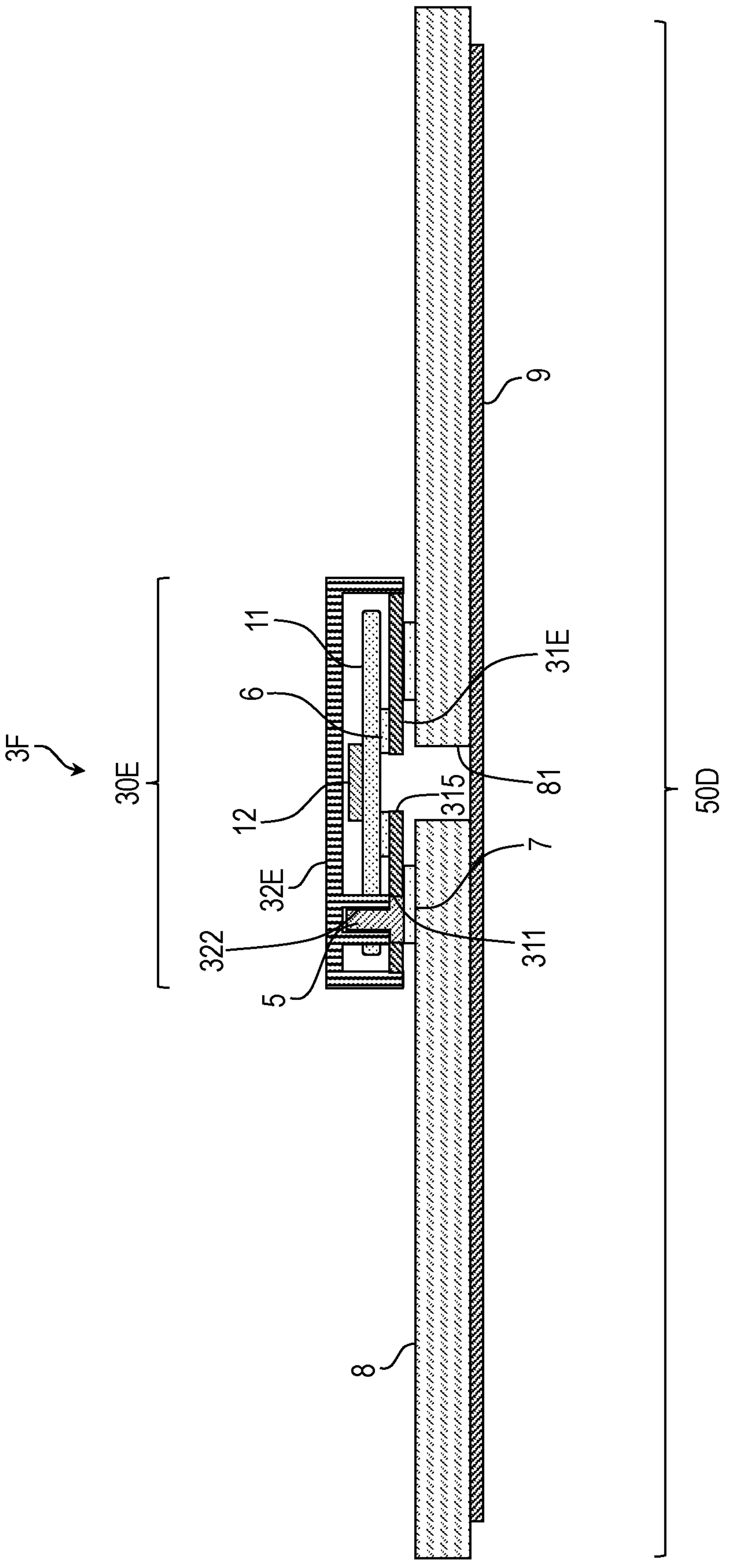
FIG. 12 is a cross-sectional view illustrating a headlining assembly according to a sixth modification of the third embodiment.

Referring to FIG. 12, the structure of a headlining assembly 3F according to a sixth modification of the third embodiment will be described below. As illustrated in FIG. 12, the headlining assembly 3F of the present modification comprises a microphone assembly 30E and a headlining 50D.

A lower housing 31E of the present modification is shaped like a plate including the foregoing hole 315. The lower housing 31E has a circuit board 11, a microphone element 12, and a cable that are mounted thereon, is disposed at a position where the hole 315 is aligned with a hole 81 located on a substrate 8, and is fixed to the front side of the substrate 8 with an adhesive layer 7. An upper housing 32E is shaped to cover the lower housing 31E, the circuit board 11, the microphone element 12, and the cable. The upper housing 32E has a threaded hole 322 extending downward from the back side. The lower housing 31E has a screw hole 311 at the bottom. A screw 5 is inserted into the screw hole 311 and is screwed into the threaded hole 322, thereby fixing the upper housing 32E to the lower housing 31E.

<Seventh modification of the third embodiment>

Figure 13:
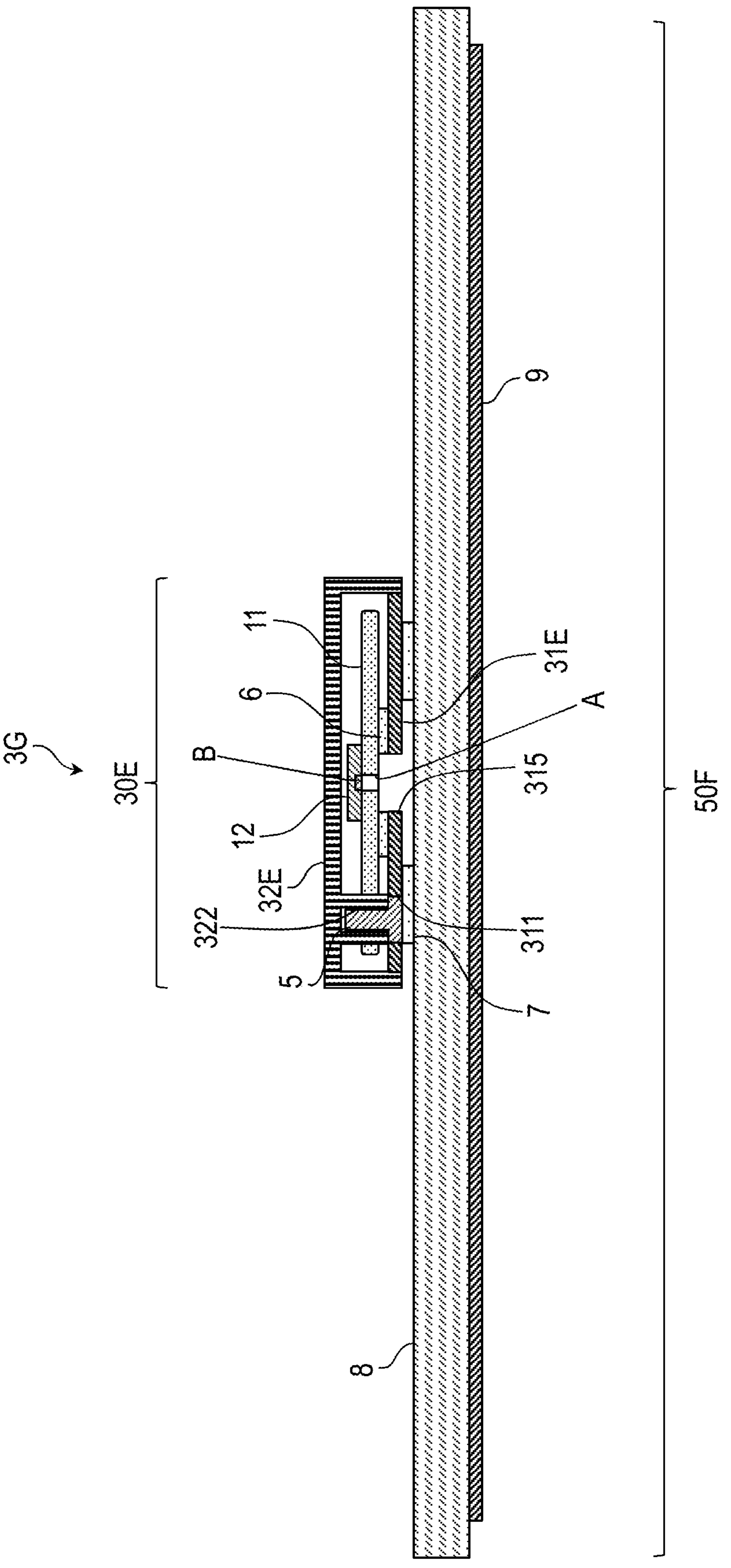
FIG. 13 is a cross-sectional view illustrating a headlining assembly according to a seventh modification of the third embodiment.

Referring to FIG. 13, the structure of a headlining assembly 3G according to a seventh modification of the third embodiment will be described below. As illustrated in FIG. 13, the headlining assembly 3G of the present modification comprises a microphone assembly 30E and a headlining 50F. The hole of the headlining 50F is omitted. Other configurations were similar to those of the sixth modification. As shown in FIG. 13, a hole A is formed to expose a sound receiving part B of the microphone element 12.

<Eighth Modification of the Third Embodiment>

Figure 14:
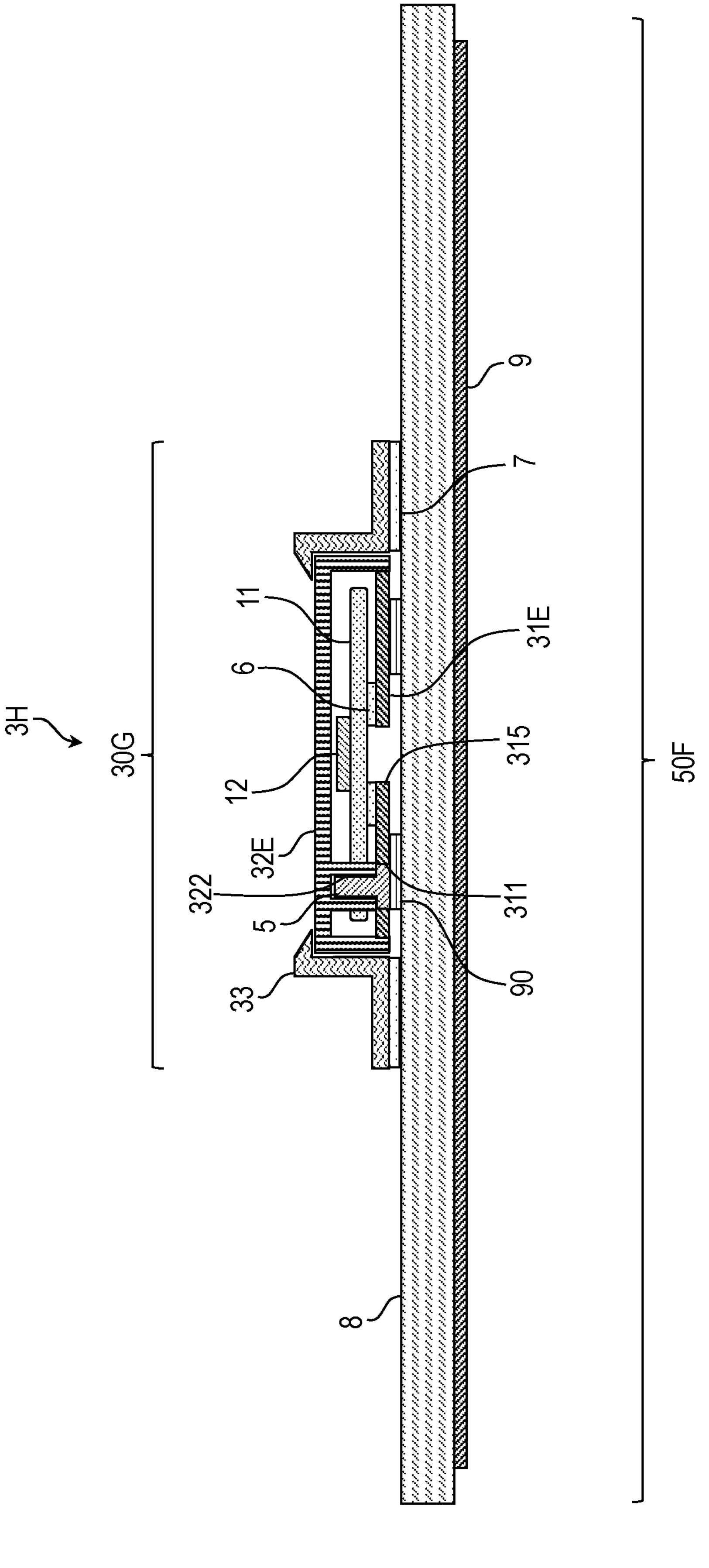
FIG. 14 is a cross-sectional view illustrating a headlining assembly according to an eighth modification of the third embodiment.

Referring to FIG. 14, the structure of a headlining assembly 3H according to an eighth modification of the third embodiment will be described below. As illustrated in FIG. 14, the headlining assembly 3H of the present modification comprises a microphone assembly 30G and a headlining 50F. The microphone assembly 30G includes a lower housing 31E, an upper housing 32E, a circuit board 11, a microphone element 12, and a cable as in the sixth and seventh modifications. The microphone assembly 30G further includes a bracket 33 outside the upper housing 32E, the bracket 33 including a claw engaged with the top surface of the upper housing 32E. The back side of the bracket 33 is fixed to the front side of a substrate 8 with an adhesive layer 7. The microphone assembly 30G is fit and fixed to the substrate 8 and the bracket 33. A shock absorber 90 is provided between the microphone assembly 30G and the substrate 8. The shock absorber 90 may be, for example, urethane.

<Ninth Modification of the Third Embodiment>

Figure 15:
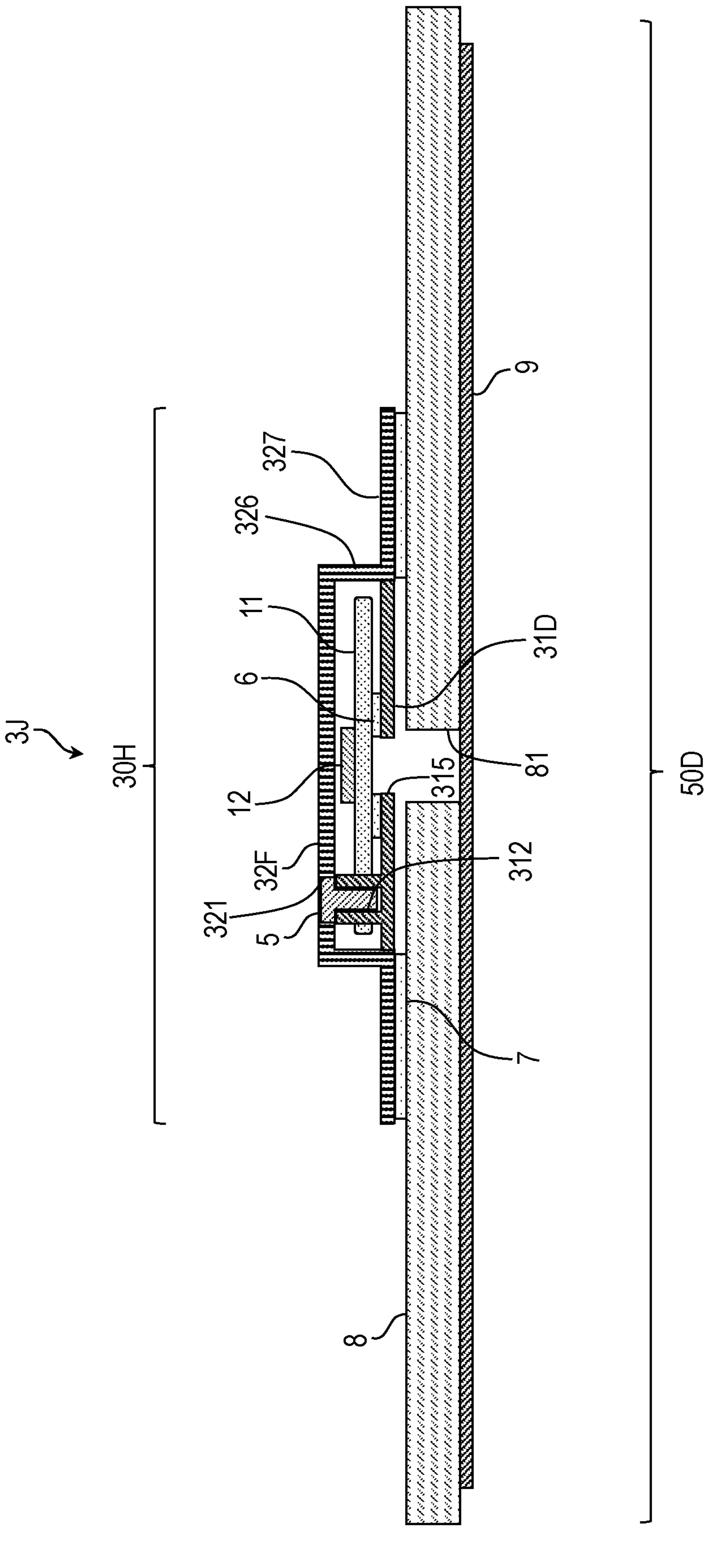
FIG. 15 is a cross-sectional view illustrating a headlining assembly according to a ninth modification of the third embodiment.

Referring to FIG. 15, the structure of a headlining assembly 3J according to a ninth modification of the third embodiment will be described below. As illustrated in FIG. 15, the headlining assembly 3J of the present modification comprises a microphone assembly 30H and a headlining 50D.

A lower housing 31D of the present modification is similar to that of the fifth modification. An upper housing 32F is shaped to cover the lower housing 31D, a circuit board 11, a microphone element 12, and a cable. The upper housing 32F includes a flange part 327 that extends, in a plane parallel to a substrate 8, from the lower end of the upper housing 32F to the outside of the lower housing 31D. The back side of the flange part 327 is fixed to the front side of the substrate 8 with an adhesive layer 7. The upper housing 32F has a screw hole 321, and the lower housing 31D has a threaded hole 312 extending upward from the bottom. A screw 5 is inserted into the screw hole 321 and is screwed into the threaded hole 312, thereby fixing the upper housing 32F to the lower housing 31D.

<Tenth Modification of the Third Embodiment>

Figure 16:
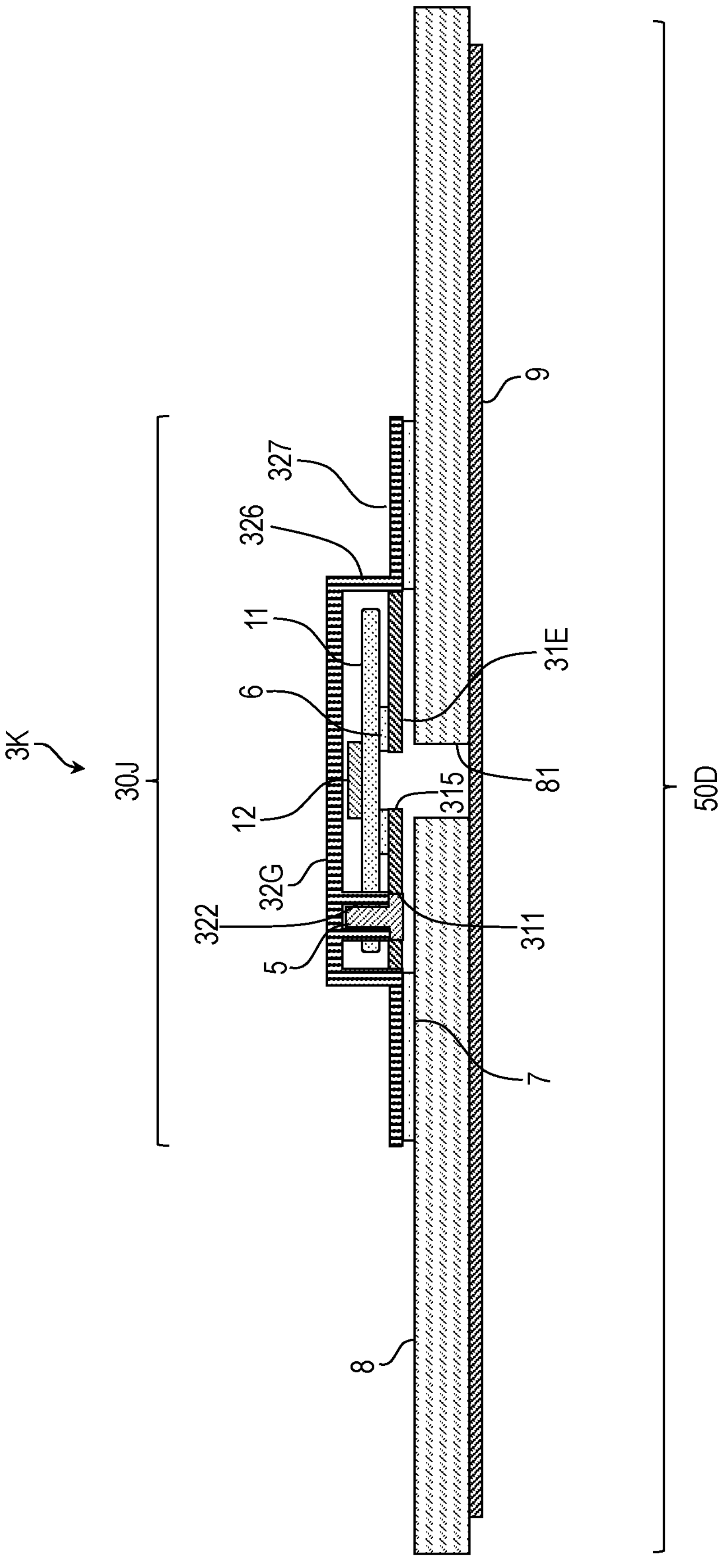
FIG. 16 is a cross-sectional view illustrating a headlining assembly according to a tenth modification of the third embodiment.

Referring to FIG. 16, the structure of a headlining assembly 3K according to a tenth modification of the third embodiment will be described below. As illustrated in FIG. 16, the headlining assembly 3K of the present modification comprises a microphone assembly 30J and a headlining 50D.

A lower housing 31E of the present modification is similar to that of the sixth modification. An upper housing 32G is shaped to cover the lower housing 31E, a circuit board 11, a microphone element 12, and a cable. The upper housing 32G includes a flange part 327 that extends, in a plane parallel to a substrate 8, from the lower end of the upper housing 32G to the outside of the lower housing 31E. The back side of the flange part 327 is fixed to the front side of the substrate 8 with an adhesive layer 7. The upper housing 32G has a threaded hole 322 extending downward from the back side. The lower housing 31E has a screw hole 311. A screw 5 is inserted into the screw hole 311 and is screwed into the threaded hole 322, thereby fixing the upper housing 32G to the lower housing 31E.

<Hole 81>

The hole 81 in the foregoing embodiments and modifications may be substituted by a recess that does not pass through the substrate 8. For example, the hole 81 may be substituted by a recess having a depth that is about a half to two thirds of the thickness of the substrate 8.

What is claimed is:

1. A headlining assembly comprising a microphone assembly comprising:

a circuit board;

a microphone element connected to the circuit board;

an external connection interface connected to the circuit board;

a lower housing that fixes the circuit board and has a hole formed to expose a part of a back side of the circuit board or a sound receiving part of the microphone element; and an upper housing that is fixed to the lower housing and is formed to cover a front side of the circuit board, the microphone element, and the external connection interface, and the headlining assembly further comprising a headlining, wherein the headlining includes:

a substrate having a front side bonded to a back side of the microphone assembly with an adhesive layer; and a skin covering a back side of the substrate, wherein neither the substrate nor the skin has holes.

* * * * *